(12) United States Patent
Huang

(10) Patent No.: US 8,114,482 B2
(45) Date of Patent: Feb. 14, 2012

(54) COATING COMPOSITION, COATED ARTICLE AND A METHOD TO MANUFACTURE THE SAME

(75) Inventor: Yo-Bu Huang, Wood Dale, IL (US)

(73) Assignee: Coveright Surfaces Canada Inc., Cobourg, Ontario (CA)

( * ) Notice: Subject to any disclaimer, the term of this patent is extended or adjusted under 35 U.S.C. 154(b) by 0 days.

(21) Appl. No.: 12/782,464

(22) Filed: May 18, 2010

(65) Prior Publication Data

US 2011/0086170 A1 Apr. 14, 2011

Related U.S. Application Data

(62) Division of application No. 11/091,774, filed on Mar. 29, 2005, now Pat. No. 7,744,994.

(60) Provisional application No. 60/557,779, filed on Mar. 30, 2004.

(51) Int. Cl.
*B05D 1/18* (2006.01)
(52) U.S. Cl. ............... 427/434.2; 427/430.1; 427/434.3
(58) Field of Classification Search ................ 427/430.1
See application file for complete search history.

(56) References Cited

U.S. PATENT DOCUMENTS

| 2,415,644 | A | * | 2/1947 | Leonhard | ............... | 427/348 |
| 3,244,552 | A | * | 4/1966 | Thompson | ............. | 427/365 |
| 4,351,862 | A | * | 9/1982 | Cosse et al. | ............. | 427/300 |
| 4,741,285 | A | * | 5/1988 | Tsubata | ............... | 118/415 |
| 5,298,335 | A | * | 3/1994 | Reed et al. | ............. | 428/511 |

FOREIGN PATENT DOCUMENTS

WO WO 0212621 A1 * 2/2002

* cited by examiner

*Primary Examiner* — David Turocy
(74) *Attorney, Agent, or Firm* — White & Case LLP

(57) ABSTRACT

The invention pertains to a coating composition, a coated material formed therewith, and a method for coating the material with the coating composition.

20 Claims, 1 Drawing Sheet

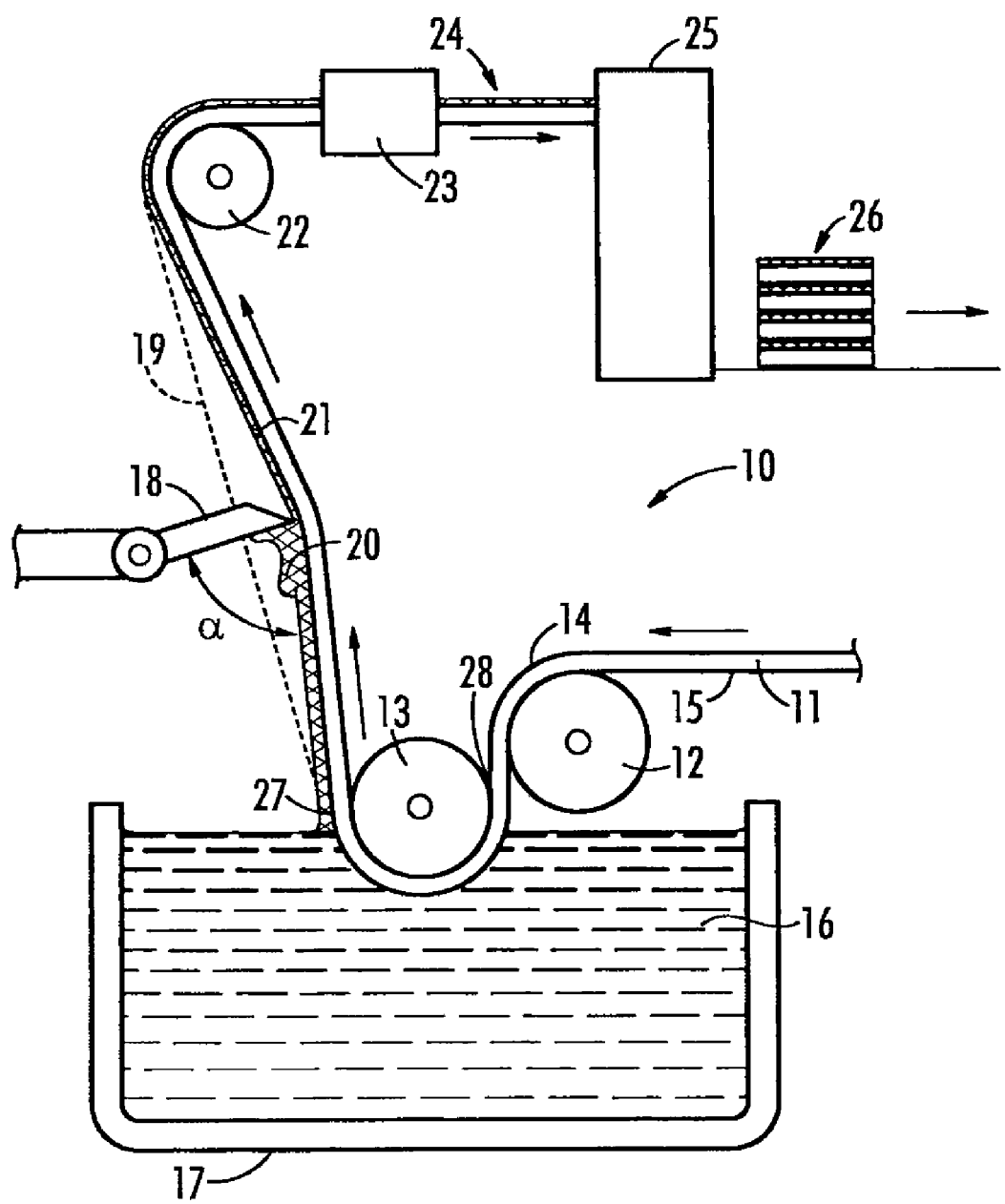

COATING COMPOSITION, COATED ARTICLE AND A METHOD TO MANUFACTURE THE SAME

This application is a divisional of application Ser. No. 11/091,774, filed on Mar. 29, 2005, now U.S. Pat. No. 7,744,994 which claims priority of U.S. Provisional Application No. 60/557,779, filed on Mar. 30, 2004. Application Ser. No. 11/091,774 and U.S. Provisional Application No. 60/557,779 are fully incorporated by reference herein.

The invention pertains to a coating composition, a coated material formed therewith, and a method for coating the material with the coating composition. One embodiment of the present invention is related to a coating composition particularly suitable for, for instance, coating of webs to form a coated article with particulat applicability, for example, as wall board or the like.

The use of wall boards is well known. Wall board typically comprises a shell made of paper or a web material and a filler such as gypsum or a foamed material, e.g. polyurethanes, polystyrenes or urea-formaldehyde-resins, there between. The shell can be coated to give the wall board a desired appearance or properties, such as stability and rigidity, gas and steam impermeability or the like. Wall board has been employed successfully for many years yet it still has properties which are undesirable. The colour, paintability and smoothness of the wall board is dictated by the shell material and its coating and has so far not reached the desired level with regard to aesthetic properties.

Also, the interconnection between the filler and the shell strongly depends on the shell material and the coating applied.

In the past, the interconnection between filler and paper shell material has always been problematic. Even when substituting the paper with web materials has not solved the problem, since the liquid components of the coating tend to pass through the web (EP 0 159 514).

Known methods for manufacture of coated scrims or webs include roll coating, spray coating and dip coating techniques. In dip coating techniques, the material to be coated runs through a bath containing the coating composition and is smoothed and/or dried afterwards. The method is very simple, however, all sides of the material are coated. In contrast to dip coating techniques, standard spray coating techniques enable the coating of only one side of an object. Theses techniques usually use nozzles, which, however, are subject to plugging, especially with highly viscous coating compositions, and may need to be cleaned or exchanged in certain time intervals. Roll coating techniques are also appropriate for covering only one side of an object. Applying those methods, a composition coated roller transfers the coating composition to the object, which may also be subject to clogging when using highly viscous compositions.

Thus it is one object of the invention to provide a composition for coating a material which is in particular suitable for, for instance, covering the mentioned shell materials. Furthermore, a method should be provided for manufacture of this coated material.

BRIEF DESCRIPTION OF THE DRAWINGS

FIG. 1 illustrates an exemplary coating apparatus for use in an embodiment of the methods of the invention.

According to the invention, the coating composition has a viscosity of 30000 mPas or less, preferably of 6000-30000, most preferably of between 8000 to 15000 mPas and comprises at least one pigment, an organic binder and at least one thickener.

It has been found that within this range of viscosities, the coating composition does not tend to droplet formation on the web and is good to handle. The rheological properties of the coating composition are important to achieve a suitable coating. Furthermore, the coating composition has a sufficient pseudoplastic characteristic with its shear thinning index being at least 3. Thus, despite its high viscosity, it is easy to apply the coating composition to the web and to transfer it in and out of the coating station. The degree of thixotropy is preferably about 0.8 to about 1.5. These values lead to a decreased viscosity in a short time range after a shear strain.

Viscosities are preferably measured by a Brookfield rotational viscometer at 3 rpm according to ASTM D2196-86. The shear thinning index is measured with a speed combination of 3 and 30 rpms (ASTM D2196-86). The degree of thixotropy is calculated by the ratio of slowest speed viscosity taken with increasing speed to that with decreasing speed.

The coating composition according to the invention can easily be applied using standard coating techniques and has the special advantage of not soaking through web materials used for the preparation of shells for wall boards. Also, the coating composition according to the invention yields a coated shell material with a good texture and pleasing appearance and which can be painted or covered with wall paper.

The coating composition of the present invention may comprise about 55-70%, by weight, solid. More preferably, the coating composition comprises about 60-62%, by weight, solid. As solvent any solvent capable of solving the solids can be applied. Preferably, the solvent is water.

In an advantageous embodiment, the solid content of the coating composition comprises 84.5-95%, by weight, pigment, 4.5-15%, by weight, organic binder and 0.025-0.5%, by weight, thickener.

In a particularly advantageous embodiment, the pigment is a silicate or a silicate comprising clay. Such pigments are inexpensive to obtain and yield a uniform colour distribution. In a further advantageous embodiment, the pigment is a silicate in a sheet form, also called phyllosilicate, or a phyllosilicate comprising clay. Due to their layered molecular structure, grinding of these minerals to small particles is facile, and the resulting pigments are suitable for the use in paints. Phyllosilicates comprise minerals such as alurgite, apophyllite, astrophyllite, bavenite, biotite, chrysotile, clinochlore, fuchsite, glauconite, kaemmererite, kaolinite, lepidolite, margarite, mica, muscovite, pennine, phlogopite, prehnite, pyrophyllite, sepiolite, serpentine, talc, vermiculite and zinnwaldite. Most preferred is kaolinite or the kaolinite comprising clay kaolin or talc due to their high brightness.

The organic binder used according to the invention is required for providing a good interconnection between the coating and the shell material and may comprise a polymer selected from polyacrylate, styrene-acrylic copolymer, vinyl-acrylic copolymer, styrene-butadiene copolymer, polyvinyl chloride, polyvinyl alcohol, polyvinyl acetate and ethylene-vinyl-acetate copolymer. In a particularly preferred embodiment, the organic binder is a styrene-polyacrylic copolymer. The coating composition may also comprise a cross-linker for the binder.

According to the invention, a thickener is added to adjust the viscosity of the composition to the preferred range. The thickener may be chosen from the group consisting of polyurethane, hydrophilic clay gellant, xanthan gum, hydroxyethyl cellulose, hydroxypropyl cellulose, methyl cellulose, hydroxypropyl cellulose and acryl based compounds. In an especially advantageous embodiment, the thickener chosen is hydrophilic clay gellant, an acrylic alkali soluble emulsion or a polyurethane. In another advantageous embodiment, the pigment chosen may also function as a thickener.

The pigment used may be a mixture of a first pigment and a second pigment. If such a mixture is used, the weight percentage of the first pigment in the composition may exceed that of the second pigment. The second pigment may be added to the composition at the same or at a different time as the first pigment. The second pigment can be added in order to improve certain property enhancements to the coating, such as higher brightness, more desirable air and vapour permeability, improved fire resistance, or to reduce costs. Particularly preferred second pigments are silicates, calcium carbonate, titanium dioxide, aluminum trihydrate and calcium sulfate. In a preferred embodiment, these second pigments are used when the first pigment is a silicate. Particularly preferred is the use of these second pigments with a phyllosilicate as the first pigment. Advantageously, the first and second pigments used are complementary or supplementary with respect to their structures. It is especially preferred that the second pigment is an inosilicate when the first pigment is a phyllosilicate. Advantageously, the phyllosilicate used in combination with an inosilicate is kaolinite or a kaolinite comprising clay or talc. Most preferred is the use of a pigment mixture comprising kaolinite or a kaolinite containing clay or talc as a first pigment and wollastonite as a second pigment. The second pigment is preferably added in an amount equal to about ⅓ to ⅔ of the weight of the first pigment.

Second thickeners may be added to the coating composition according to the invention to control the viscosity and pseudoplastic/thixotropic properties of the coating composition. Second thickeners are preferably added as the last ingredient due to the increase in viscosity caused by their addition. Typical second thickeners include alkali swellable emulsions, preferably polyacrylate based, ethoxylated urethanes and polyether polyols. Most preferred are second thickeners on the basis of polyacrylate based alkali swellable emulsions or ethoxylated urethanes.

In further advantageous embodiments, additives can be incorporated into the coating composition to improve rheology or to enhance the properties of the finished product. Such additives comprise biocides, dispersing agents and additional pigments.

The addition of biocides can reduce the propensity of the composition and the finished article for mold and mildew growth. Biocides can exhibit their function in the liquid state or in the final solid product. Biocides are readily available commercially including: substituted 3-isothiazolones, diiodomethyl p-tolyl sulfone and derivatives thereof, dibromo nitrilo propionamide and derivatives thereof, o-phenylphenol or its salts, 2,6-dimethyl-m-dioxan-4-ol-acetate, 1-(3-chloroallyl)-3,5,7-triaza-1-azoniaadamamantane chloride, 2-bromo-2-nitropropane-1,3-diol, 2-(hydroxymethyl)-2-nitro-1,3-propanediol, 4,4-dimethyl-oxazolidine, ortho-phthalaldehyde, β-bromo-β-nitrostyrene, 4-(2-nitrobutyl)-morpholine and glutaraldehyde. In a particularly preferred embodiment, diiodomethyl p-tolyl sulfone is used.

Dispersing agents, or surfactants, are preferably included in the coating composition to ensure that the pigment particles are dispersed. The dispersing agents may be added at a level of about 0.2 to 1%, by weight, based on the coating solids. Particularly suitable dispersing agents include, for example, salts of carboxylated polyacrylate or polymethacrylate, salts of polymerized alkyl naphthalene sulfonic acids and sodium lignosulfonate. Preferred dispersing agents are salts of polyacrylate.

Also, additional pigments such as carbon black and ink oxide can be added.

Preferably the coating composition according to the invention is a web, preferably a fibrous web, capable of bonding with the coated solid. Examples of preferred webs include mineral-type materials such as glass fibers and synthetic resin fibers. Glass fiber webs are most preferred. Woven or unwoven webs can be employed with unwoven webs being preferred. Continuous or discrete strands or fibers can be incorporated into either the woven or nonwoven web with the strands bonded together by a suitable adhesive.

Crosslinking agents may be incorporated to improve the strength of the coated layer. Crosslinking agents include aldehydes, vinyl sulfones, imidazoliums, triazines and others as described in T. H. James, *The Theory Of The Photographic Process*, Fourth Edition, Eastman Kodak Company, Rochester, N.Y., 1977, Chapter 2, pp. 77-8.

According to the invention, the coating composition is most preferably applied to a web applying a novel roll dip coater. A dip roller is preferably immersed in the coating composition to an arbitrary depth not exceeding the tangential point where the substrate leaves the roller. Line speed and depth are adjusted to control the immersion time. The time level is about 0.1 to 0.5 seconds, most preferably about 0.2 seconds. The immersion time is a determining factor in the amount of coating picked up by the web. The web is sufficiently tight around the roll to ensure a firm full contact between the substrate and the roller during the time the substrate travels through the coating bath. The web is preferably held against the roll by a tension of preferably about 40 to 150 N/m.

In a preferred embodiment according to the invention, a doctor blade or an air-knife can be employed, which removes excess coating to control coating weight. Also, the coated surface can be smoothed. Preferably, a doctor blade is used. This device is preferably a steel tool with a square nose and sharp edge. It is preferred that the doctor blade be angled upward at an acute angle of 15-75°, preferably 45°, with respect to the moving web. The deflection caused by the blade towards the substrate is preferably between about 0.5 to 2 cm and most preferably about 1 cm.

The coating is preferably applied to provide a dry coating weight of 100-130 g/m².

It is preferred that the coating be applied by a combination dip coater with a doctor knife to control coating weight. The coating method will be described with reference to FIG. 1. forming an integral non-limiting part of the present invention.

In FIG. 1, the coating apparatus is generally provided at 10. The web, 11, is provided from a supply roll, not shown, which may include accumulators, tension devices, tracking devices and the like currently employed in the art of coating and web or web transport. The web, 11, has a backside, 14, and a front side, 15, wherein the backside remains void of coating material and the front side is coated. The path of the web is redirected by a tension roller, 12, the purpose of which is to insure that the mat wraps around a sufficient amount of a dip roller, 13, to avoid the backside, 14, from being coated. The front side, 15, is coated by a coating solution, 16, in a dip pan, 17. As would be realized from the description and FIGURE, the backside of the web is in contact with the dip roller, 13, and therefore remains clean of coating material, 16. A sufficient amount of coating solution adheres to the front side of the web to represent a slight excess over the desired wet coating weight. A doctor knife, 18, applies tension to the coated web in an amount sufficient to deflect the web from the free-path, represented by a dotted line, 19. The tension of the doctor knife on the web removes excess coating solution, 20, carried by the web and passes the predetermined wetted coating weight, 21. An optional guide roller, 22, directs the web through a dryer, 23, whereby the solvent is removed yielding a dried coated board, 24. The dried coated board then passes through a finishing operation, 25, wherein the dried coated board is cut to size and collated into a package, 26, for shipment.

The depth of the coating roll, 13, into the coating pan, 17, is chosen to maximize contact between the coating solution, 16, and the front face of the web, 15. The depth is chosen to insure that the exit tangent, 27 of the coating roll at the point of departure of the web from the dip roll, or the entrance tangent, 28, of the initial point of contact of the roll is above the surface of the coating solution. It is important that the entrance and exit tangents are above the surface of the coating solution to insure that the backside, 15, is not coated with coating solution. The backside is therefore protected from being coated by contact with the dip roller. While not shown, edge knives may be used to scrape the coating solution off of the web at the edge to avoid coating solution from wrapping around. In general, the rheology of the coating solution is sufficient to avoid inadvertent coating of the backside by wrap around.

The line speed, and depth, are adjusted to allow the immersion time to be within about 0.1 to 0.5 seconds, preferably about 0.2 seconds. The immersion time is a determining factor in the amount of coating picked up by the web. The web is sufficiently tight around the roll to insure a firm full contact between the substrate and the roller during the time the substrate travels through the coating bath. The web is held against the roll by tension which is preferably about 40 to 150 N/m.

A doctor blade is preferably used to control coating weight. The doctor blade is preferably a steel tool with a square nose and sharp edge. It is preferred that the doctor blade be angled upward at an acute angle, α, of 15-75°, preferably about 45°, with respect to the moving web. The deflection caused by the blade towards the substrate is preferably between about 0.5 to 2 cm and most preferably about 1 cm. The deflection is represented as the distance between the free path represented as the dotted line, 19, and the deflected path at the doctor knife.

The coated substrate may be passed through an air flotation oven for drying. The drying rate, and oven residence time, depends on the drying configuration and coating weight. At 100° C. at least 30 seconds is required to reach the desired residual moisture level of less than about 0.5%.

The invention will be more thoroughly described with reference to the following example which does not limit the invention.

Example

A coating composition was prepared using as a binder, 170 kg of Rhoplex NW1845K, a crosslinkable, styrene acrylic emulsion for textiles available from Rohm and Haas Company; 340 kg water; 100 kg of Van Gel B 7%, a colloidal magnesium aluminum silicate (smectite) available from R.T. Vanderbilt Company as a thickener; 0.35 kg of Amical Biocide, which is a biocide available from Dow Biocides; 8 kg of Darvan 811, which is sodium polyacrylate and a dispersing agent available from R.T. Vanderbilt Company; 250 kg of Vansil W10, which is wollastonite, a calcium metasilicate mineral, a pigment also available from R.T. Vanderbilt Company; as a primary pigment, 500 kg of Nytal 200, which is a hydrous calcium magnesium silicate mineral (talc) available from R.T. Vanderbilt Company; and 15.9 kg of Acrysol RM-5, a thickening acrylic alkali soluble emulsion available from Rohm and Haas Coatings.

The coating composition has a measured absolute viscosity of 8.000-15.000 mPas; a shear thinning index of least 3; a thixotropy of 0.8-1.5 and a solid content of 60.7%.

The composition is used to cover 90-100 g/m² webs using the dip roll coating method as described. The coating was dried in an air flotation dryer at a temperature above about 100° C. for at least 30 seconds residence time to a residual moisture of no more than about 0.5%. The dry weight of the coated substrate was 190-230 g/m², corresponding to a coating weight of 100-130 g/m².

The invention has been described with particular reference to the preferred embodiments without limitation to the metes and bounds of the invention which are more specifically set forth in the claims appended hereto.

What is claimed is:

1. A method of coating a web with a coating composition comprising coating the web using a roll dip coater immersed in the coating composition to an arbitrary depth, wherein:
   said depth does not exceed the tangential point where the substrate leaves the roller;
   only one side of the web is coated; and
   the coating composition has an absolute viscosity of 6000 to 30000 mPas and comprises:
   two or more pigments;
   an organic binder;
   at least one thickener;
   55-70% by weight solids; and
   a phyllosilicate or a phyllosilicate-comprising clay as a first pigment and an inosilicate or an inosilicate-comprising pigment as a second pigment.

2. The method according to claim 1, wherein a tension of 40 to 150 N/m holds the web against the roller.

3. The method according to claim 1, further comprising adjusting the amount of coating composition on the web with a doctor knife or an air-knife.

4. The method according to claim 3, wherein said doctor knife or air knife is angled upward at an acute angle of 15-75° with respect to the moving web.

5. The method according to claim 3, wherein said doctor knife or air knife causes a deflection of 0.5 to 2 cm between a deflected path of the web at the doctor knife or air knife and the natural path of the web.

6. A method of coating a web with a coating composition comprising coating the web using a roll dip coater immersed in the coating composition to an arbitrary depth, wherein:
   said depth does not exceed the tangential point where the substrate leaves the roller;
   only one side of the web is coated; and
   the coating composition has an absolute viscosity of 6000 to 30000 mPas and comprises:
   at least one pigment;
   at least one organic binder;
   at least one thickener;
   55-70% by weight, solids; and
   a styrene-polyacrylate binder, diiodomethyl p-tolyl sulfone, brown tint, a sodium polyacrylate disperant, wollastonite, kaolinite or a kaolinite-comprising clay and an acrylic alkali soluble emulsion.

7. The method according to claim 6, wherein a tension of 40 to 150 N/m holds the web against the roller.

8. The method according to claim 6, further comprising adjusting the amount of coating composition on the web with a doctor knife or an air-knife.

9. The method according to claim 8, wherein said doctor knife or air knife is angled upward at an acute angle of 15-75° with respect to the moving web.

10. The method according to claim 8, wherein said doctor knife or air knife causes a deflection of 0.5 to 2 cm between a deflected path of the web at the doctor knife or air knife and the natural path of the web.

11. A method of coating a web with a coating composition comprising coating the web using a roll dip coater immersed in the coating composition to an arbitrary depth, wherein:
- said depth does not exceed the tangential point where the substrate leaves the roller;
- only one side of the web is coated; and
- the coating composition has an absolute viscosity of 6000 to 30000 mPas and comprises:
  - at least one pigment;
  - at least one organic binder;
  - at least one thickener; and
  - 55-70% by weight, solids; and
  - a styrene-polyacrylate binder, a hydrophilic clay gellant, diiodomethyl p-tolyl sulfone, a sodium polyacrylate disperant, wollastonite, talc and an acrylic alkali soluble emulsion.

12. The method according to claim 11, wherein a tension of 40 to 150 N/m holds the web against the roller.

13. The method according to claim 11, further comprising adjusting the amount of coating composition on the web with a doctor knife or an air-knife.

14. The method according to claim 13, wherein said doctor knife or air knife is angled upward at an acute angle of 15-75° with respect to the moving web.

15. The method according to claim 13, wherein said doctor knife or air knife causes a deflection of 0.5 to 2 cm between a deflected path of the web at the doctor knife or air knife and the natural path of the web.

16. A method of coating a web with a coating composition comprising coating the web using a roll dip coater immersed in the coating composition to an arbitrary depth, wherein:
- said depth does not exceed the tangential point where the substrate leaves the roller;
- only one side of the web is coated; and
- the coating composition has an absolute viscosity of 6000 to 30000 mPas and comprises:
  - at least one pigment;
  - at least one organic binder;
  - at least one thickener;
  - 55-70% by weight, solids; and kaolinite or a kaolinite-comprising clay and wollastonite as first and second pigments, polyurethane as a thickener, a styrene-polyacrylate emulsion as a binder and diiodomethyl p-tolyl sulfone, a sodium salt of a polyacrylate, ink oxide and carbon black as additives.

17. The method according to claim 16, wherein a tension of 40 to 150 N/m holds the web against the roller.

18. The method according to claim 16, further comprising adjusting the amount of coating composition on the web with a doctor knife or an air-knife.

19. The method according to claim 18, wherein said doctor knife or air knife is angled upward at an acute angle of 15-75° with respect to the moving web.

20. The method according to claim 18, wherein said doctor knife or air knife causes a deflection of 0.5 to 2 cm between a deflected path of the web at the doctor knife or air knife and the natural path of the web.

* * * * *